United States Patent [19]
Fearon

[11] 3,820,103
[45] June 25, 1974

[54] SYSTEM FOR DETECTING AN OBJECT WITHIN A MAGNETIC FIELD

[75] Inventor: Edward R. Fearon, Richardson, Tex.

[73] Assignee: Stop-Loss Incorporated, Atlanta, Ga.

[22] Filed: Dec. 15, 1972

[21] Appl. No.: 315,319

[52] U.S. Cl............... 340/280, 324/41, 331/8, 335/219, 335/284, 335/299, 340/258 C
[51] Int. Cl............................................ G08b 13/24
[58] Field of Search............ 340/280, 258 R, 258 C; 324/41; 335/219, 284, 299; 331/8

[56] References Cited
UNITED STATES PATENTS
3,559,201  1/1971  Hilliard ........................ 340/324 C
3,707,672  12/1972  Miller et al. .................... 324/41

FOREIGN PATENTS OR APPLICATIONS
763,681  5/1934  France ........................ 340/258 C Primary Examiner—David L. Trafton
Attorney, Agent, or Firm—Richards, Harris & Medlock

[57] ABSTRACT

The specification discloses a system for detecting a marker secured to an object when the object is positioned within an interrogation zone having a magentic field periodically varying at a predetermined fundamental frequency. The magnetic field is generated by a coil unit including a plurality of loops of rigid hollow metal pipe which is electrically resonated by capacitors and energized by an electrical signal having a frequency equal to the resonant frequency of the electrical circuit. Phase-lock loop circuitry is provided to maintain the drive to the pipe loops at a frequency equal to the resonant frequency of the pipes, irregardless of variance in the load imposed in the magnetic field generated by the pipes. The transmitting pipe loops are also driven by electrical signals of less than full wave, such that the generated magentic field has improved distortion characteristics. The marker of the invention generates detectable signals containing harmonics of the fundamental frequency of the alternating magnetic field. Detection circuitry is provided to detect the harmonic signals generated by the marker. The detection circuit is gated in synchronism with the less than full wave driving signal applied to the transmitting coil. A dropout circuit is provided to disconnect the transmitting circuitry in case a heavy load is imposed upon the magnetic field.

11 Claims, 22 Drawing Figures

SYSTEM FOR DETECTING AN OBJECT WITHIN A MAGNETIC FIELD

FIELD OF THE INVENTION

This invention relates to systems for detecting objects within an interrogation zone, and more particularly relates to systems for detecting non-linear ferromagnetic markers which generate detectable harmonic signals when placed in an alternating magnetic field interrogation zone.

THE PRIOR ART

Systems have been heretofore developed wherein ferromagnetic strips or markers are applied to objects and a magnetic field is imposed at an interrogation zone. Passage of the ferromagnetic strips through the interrogation zone generates detectable signals which may be utilized to indicate the presence of the object within the interrogation zone. Such previously developed systems have been utilized to prevent shoplifting in retail stores and to prevent unauthorized removal of such objects as books from libraries and the like. Examples of such prior systems are disclosed in U.S. Pat. No. 3,631,442, issued Dec. 28, 1971, and in U.S. Pat. No. 3,665,449, issued May 23, 1972.

While such previously developed detection systems for detecting ferromagnetic markers have generally worked well in practice, it has been found that the magnetic fields generated by such systems are not completely uniform but are often somewhat distorted. Moreover, it has been found that prior transmitting coils for establishing a magnetic field in such systems are sometimes not driven at the desired resonant frequency, thereby reducing the efficiency of the system. Further prior detection systems have not been completely satisfactory with respect to accuracy or safeguards against improper detection.

SUMMARY OF THE INVENTION

In accordance with the present invention, a coil unit is provided for detection of all objects passing through an interrogation zone. The coil unit includes an upright housing for being positioned adjacent the interrogation zone. A plurality of loops of rigid metal pipe are mounted within the upright housing and extend vertically for approximately the height of a person traversing the interrogation zone. A predetermined capacitance is mounted in the housing and is connected across the loops of rigid metal pipe to electrically tune the pipes to a predetermined frequency. Circuitry is connected to the loops of rigid metal pipe to generate in the interrogation zone an alternating magnetic field having a fundamental frequency. A plurality of coils of wire are mounted in the housing in the center of the loops of metal pipe and are turned to receive harmonics of the fundamental frequency.

In accordance with another aspect of the invention, a system is provided for detecting a magnetic marker within the interrogation zone. Electrical circuitry is connected to the coil for supplying an alternating electrical signal to drive the coil to generate an alternating magnetic field in the interrogation zone. The alternating electrical signal comprises a plurality of spaced-apart periodic pulses such that the coil is not continuously driven by the electrical signal, wherein the magnetic field has improved distortion characteristics.

In accordance with yet another aspect of the invention, a system for detecting a magnetic marker in an interrogation zone includes a coil for being disposed adjacent the interrogation zone. Electrical driving circuitry applies alternating electrical signals to the coil. The electrical signals have a fundamental frequency substantially equal to the resonant frequency of the coil. A phase-lock loop is connected between the coil and the electrical driving circuitry for varying of the fundamental frequency to maintain the coil in resonance, irrespective of variations in the loading of the magnetic field in the interrogation zone.

DESCRIPTION OF THE DRAWINGS

For more complete understanding of the present invention and for further objects and advantages thereof, reference is now made to the following description taken in conjunction with the accompanying drawings, in which.

DESCRIPTION OF THE PREFERRED EMBODIMENT

Figure 1:
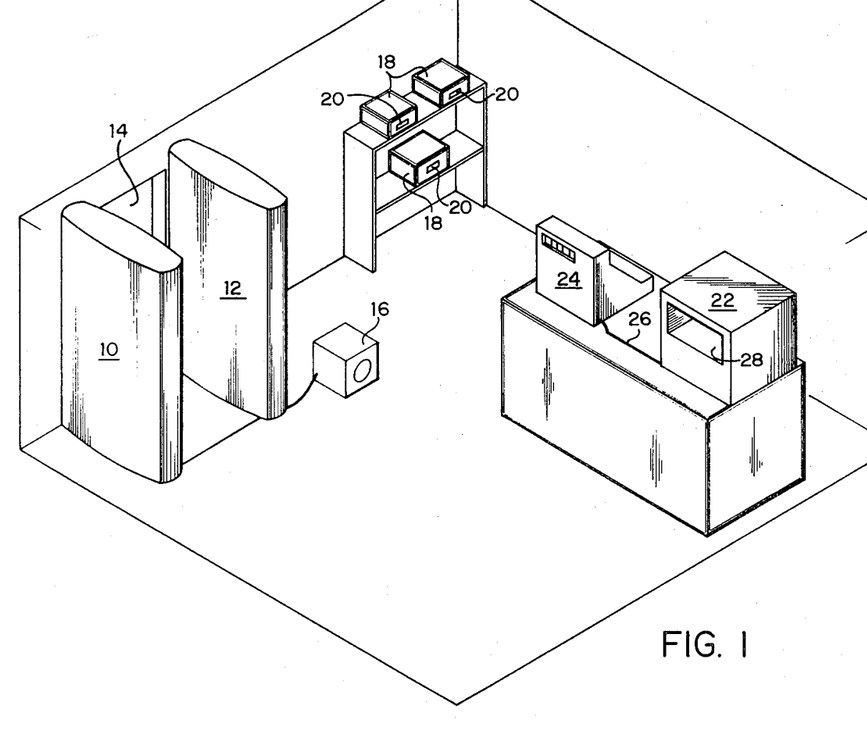
FIG. 1 is a somewhat diagramatic illustration of a typical store installation of the present detection system.

Referring to FIG. 1, a somewhat diagramatic view of a typical installation of the present system is illustrated. The system includes a pair of coil units 10 and 12 disposed on opposite sides of a path leading to the exit 14 of a store. Detection circuitry and an alarm system is mounted within a cabinet 16. A plurality of objects 18, which may comprise items for retail sale or books to be checked out, are displayed within the store. Each of the objects 18 has attached thereto a marker 20 constructed in accordance with the present invention. As will be subsequently described, the marker 20 includes elongated ferromagnetic strips which normally are in the activated mode. When in the activated mode, the marker 20 will cause an alarm to be emitted from the cabinet 16 when placed between the coil units 10 and 12. The markers 20 thus prevent unauthorized removal of the objects 18 from the store.

A deactivator system 22 is disposed on the checkout table adjacent to a cash register or other auxiliary device 24. The deactivator device is interconnected to cash register 24 via wire 26. After an object 18 has been properly paid for or otherwise checked out, the object 18 is disposed within an aperture 28 within the deactivation system 22, and a similar field as is generated by coil units 10 and 12 is applied to the marker 20. Detection circuitry within the deactivation system 22 then detects harmonic signals generated by the marker 20 and activates a gaussing circuit. The gaussing circuit applies a high magnetic field to the marker 20 to place the marker in a deactivated mode. The deactivation device 22 then senses to insure that the marker has been deactivated, and then generates an electrical signal via the wire 26 to allow the cash register 24 to be opened. The object 18 and the deactivated marker 20 may then be carried between the coil units 10 and 12 without the generation of an alarm signal from the cabinet 16. As will be subsequently described in greater detail, the safeguard features provided by the deactivation unit 22 prevent an improperly deactivated marker from being carried through the exit 14, thus eliminating the embarrassment and attendant problems created by a false alarm.

Figure 2:
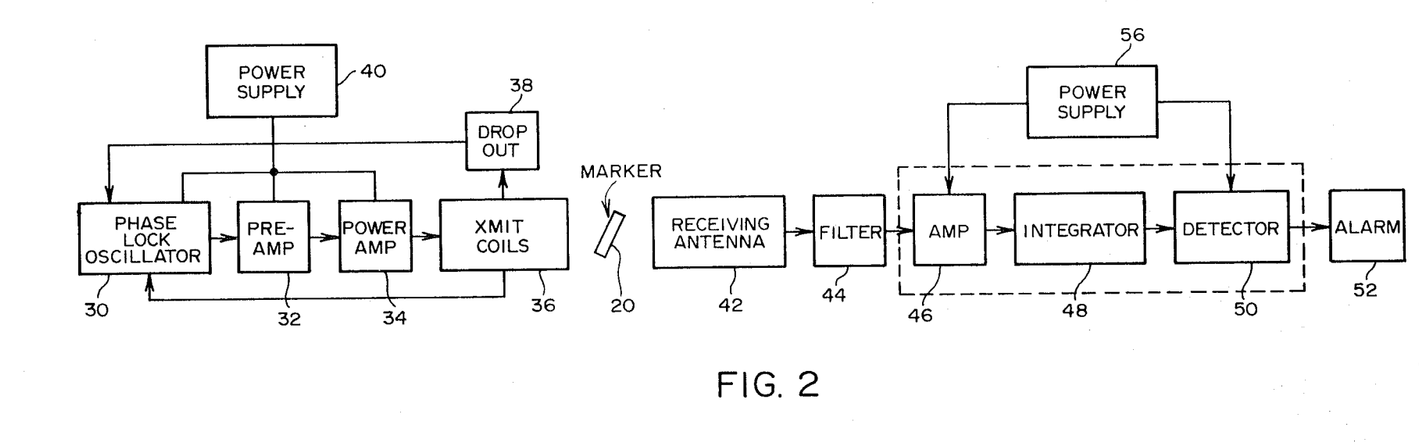
FIG. 2 is a block diagram of the marker detection portion of the system shown in FIG. 1.

FIG. 2 illustrates in block diagram form the marker detection system of the invention. A phase lock oscillator 30 generates a prescribed fundamental frequency suitable to resonate the coil units 10 and 12, which in the preferred embodiment comprises 2500 KHz. The frequency is passed through a frequency amplifier 32 and a power amplifier 34 and is applied to the transmitting coils 36 which are disposed within the coil units 10 and 12. The transmitting coils 36 operate in resonance to generate an alternating magnetic field having a fundamental frequency of 2,500 Hz. This field is applied between the coil units 10 and 12 to form an interrogation zone through which all persons exiting the secure area must pass.

A dropout circuit 38 is connected between the transmitting coils 36 and the phase lock oscillator 30 to disable the oscillator 30 in case a heavy metal object is placed in the interrogation zone in order to prevent damage to the system. A power supply 40 provides power to the transmitting system.

A marker 20 is illustrated as being disposed between the transmitting coils 36 and the receiving antenna 42. The receiving antenna 42 is also located within the coil units 10 and 12 in a manner to be subsequently described. The receiving antenna 42 detects signals generated in response to the marker 20 having high order harmonics of the fundamental frequency transmitted by the transmitting coils 36. In the preferred embodiment, the harmonic signals detected by the receiving antenna 42 are in the range of about 80 – 250 KHz. The transponding operation of the marker 20 is disclosed in greater detail in U.S. Pat. No. 3,631,442 and No. 3,665,449, previously identified.

The harmonic signals received by the receiving antenna 42 are applied through a filter 44 to eliminate noise and the filtered signals are applied through an amplifier 46. The amplifier signals are applied to an integrator 48 and subsequently to a detector 50. If a signal having a prescribed frequency content persists a determined length of time, the detector 50 activates an alarm 52 which generates either an audible or visual alarm to indicate the presence of an unauthorized object within the interrogation zone. Although not illustrated, a logic computer may be provided which requires a valid signal to be present for 10 consecutive cycles to prevent a false alarm. A power supply 56 provides power to the detection circuit.

Figure 3:
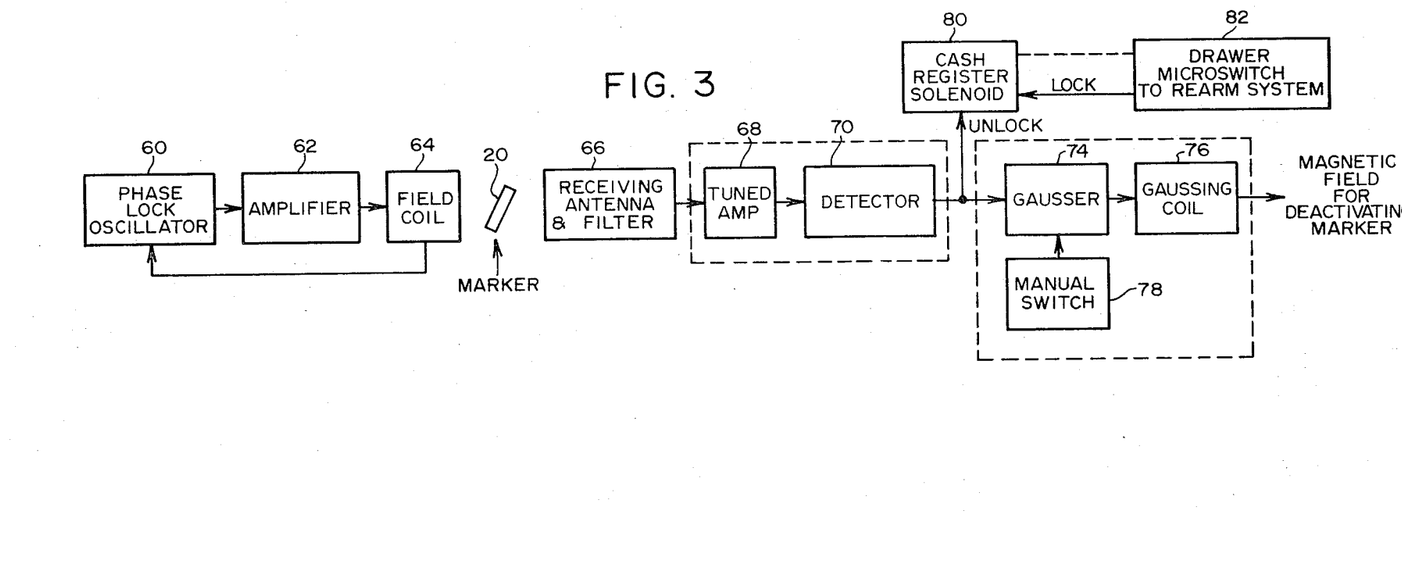
FIG. 3 is a block diagram of the deactivation circuitry of the system shown in FIG. 1.

FIG. 3 illustrates a block diagram of the circuitry of the deactivation system. Basically, the deactivation system comprises a small replica of the detection circuitry shown in FIG. 2, in combination with a gaussing circuit for deactivating the label. The system includes a phase lock oscillator 60 which generates a 2,500 Hz signal which is amplified by an amplifier 62. The amplified signal is applied to a field coil 64 located in the aperture 28 of the deactivator system 22. In the preferred embodiment, the amplifier 62 may comprise any one of a number of well known amplifier circuits including the Crown D–150 High Fidelity Amplifier. The field coil 64 in the preferred embodiment comprises 35 turns of No. 6 wire. The field coil 64 thus generates in the aperture 28 of the deactivator system 22 a magnetic field oscillating about a fundamental frequency of 2,500 Hz. When a marker 20 is placed in the field, the marker generates harmonics of the fundamental frequency in the manner previously described. In the preferred embodiment, the marker 20 generates harmonic signals within the range of 80 to 250 KHz.

The harmonic signals are received by an antenna and filter 66 which are also mounted within the aperture 28 of the deactivation system 22. The harmonic signals are applied through a tuned amplifier 69 and are applied to a detector 70. The output of the detector 70 is applied to a gausser circuit 74 which generates an electrical signal for application to a gaussing coil 76. The gaussing coil 76 applies a high magnetic field to the marker 20 within the aperture 28 of the deactivation system 22 to deactivate the label 20. In the preferred embodiment, the gaussing coil 76 generates a magnetic field in the range of 100 – 1,000 oersteds. A manual switch 78 may be utilized to manually operate the gausser 74 if required.

The output of the detector 70 is also applied to a cash register solenoid 80 which prevents operation of a key or the drawer of the cash register when locked. The unlock signal applied from the detector 70 is not generated until the gausser 74 has been energized and until a signal is no longer received and detected by the detector 70. When no signal is received from the detector 70, thus indicating that the marker 20 is deactivated, the cash register solenoid is unlocked to allow operation of the cash register 24. A key or drawer operated microswitch 82 is provided on the cash register to rearm the solenoid 80 when the key or drawer of the cash register is closed. Once the drawer of the cash register is closed, the cash register may not again be utilized until the solenoid 80 is again unlocked.

Figure 4:
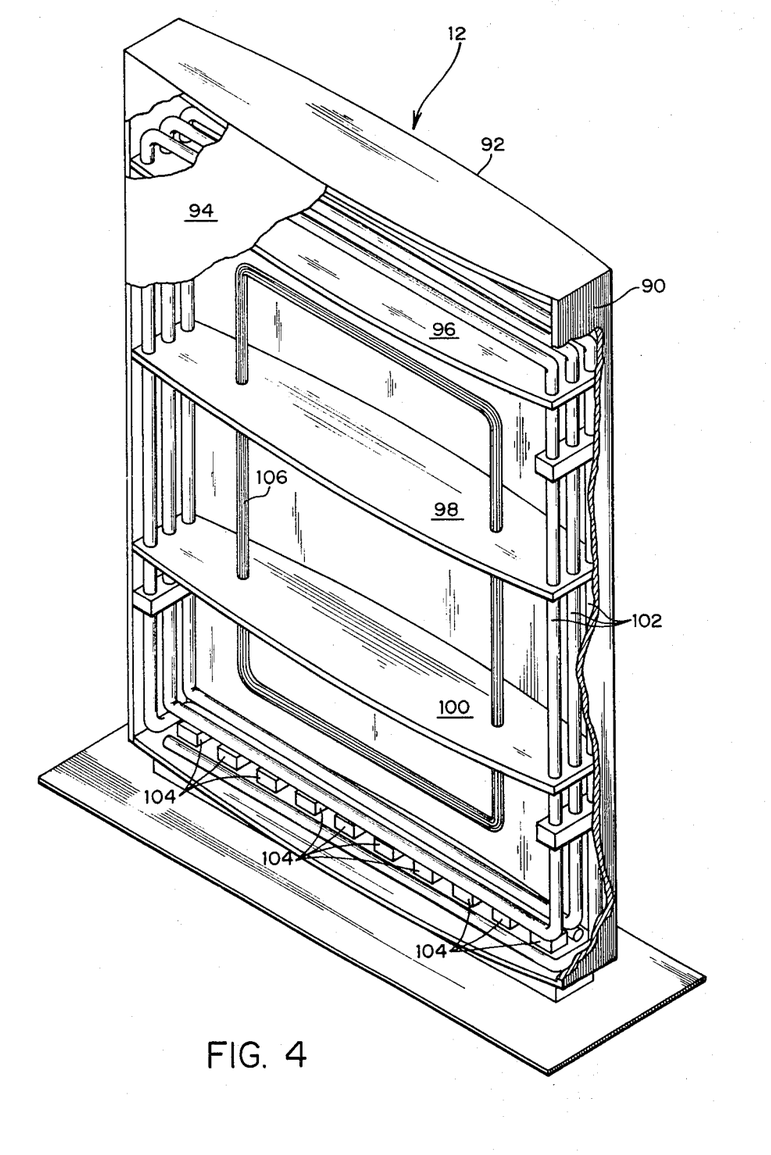
FIG. 4 is a perspective view, partially broken away, of one of the transmitting and receiving coil units placed adjacent to the interrogation zone according to the invention.

FIG. 4 illustrates a prospective view, partially broken away, of the coil unit 12. The coil unit includes an upright housing 90 including a rectangular open-ended frame with decorative screen portions 92 and 94 covering the ends. The housing extends vertically for a distance approximating the height of an individual A plurality of wooden brackets 96, 98 and 100 extend across the width of the housing 90 for support of the transmitting and receiving coils of the invention. The transmitting coil comprises a plurality of loops of rigid metal pipe 102 having air filled interiors. In the preferred embodiment, the pipe comprises three loops of copper tubing or pipe having a 1 inch inner diameter and 1⅛ inch outer diameter. The loops of pipe comprise a plurality of linear portions joined together by 90° elbows. In the preferred embodiment, the transmitting coil extends vertically for approximately 60 inches and has a width of approximately 35 inches in order to encompass an area in which one of the tagged objects would usually be carried to the interrogation zone. The loops of rigid pipe 102 extend through apertures within the wooden shelves 96, 98 and 100 and are thus rigidly supported within the housing 12. A plurality of capacitors 104 are tied across the ends of the loops of pipe to provide an L-C circuit. In the preferred embodiment, the capacitors comprise 10 20-mf capacitors.

The receiving antenna or coil 106 in the preferred embodiment comprises 15 loops of No. 22 wire also rigidly supported within the housing 12 by the brackets 98 and 100. As previously described, the source of alternating electrical energy is connected to the rigid pipes 102 and a magnetic field is thus established in the interrogation zone between the coil units 10 and 12. The harmonic signals generated by the presence of a marker are detected by the receiving coil 106.

Figure 5:
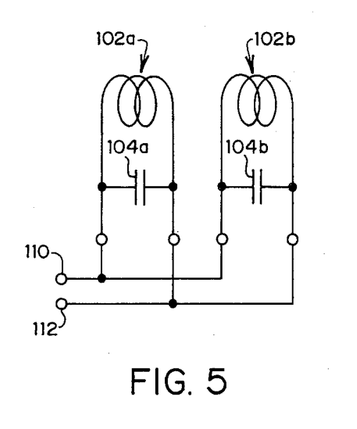
FIG. 5 is a schematic illustration of the interconnection of the transmitting coil units of the present invention.

FIG. 5 illustrates how the transmitting coils within coil units 10 and 12 are interconnected. The first set of loops of rigid metal pipe is termed 102a and is disposed in the coil unit 12, with the second set of loops of rigid metal pipe being termed 102b and is disposed within the coil unit 10. A capacitance 104a of 200 mf is connected across the loops 102a, while a similar capacitance 104b is connected across the loops 102b. Like terminals of the loops 102a and 102b are interconnected to terminals 110 and 112 such that the loops are connected in an aiding configuration.

Figure 6:
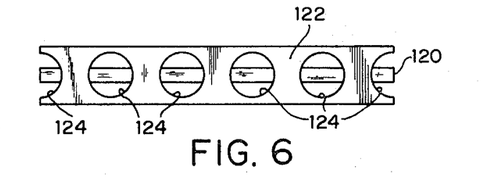
FIG. 6 is a top view of one embodiment of a deactivatable marker according to the invention.
Figure 7:
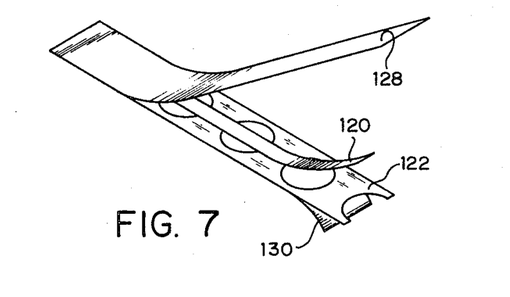
FIG. 7 is a perspective view illustrating the assembly of the marker shown in FIG. 6.

FIGS. 6 and 7 illustrate the construction of one embodiment of a marker according to the invention. The marker comprises an elongated strip 120 of ferromagnetic material having a relatively low coercivity. In the preferred embodiment, the strip 120 comprises a narrow ribbon of easily saturable high permeability material such as the material known by the tradename Supermalloy. In the preferred embodiment, the strip 120 has a length of 3 inches, a width of ⅛ inch and a thickness of approximately 0.7 mil. As previously noted, when strip 120 is excited by an alternating magnetic field having a fundamental frequency of 2,500 Hz, the strip generates a signal having harmonics in the range of 80 to 250 KHz.

A second ferromagnetic structure 122 is disposed over the strip 120 to enable deactivation of the strip 120. Structure 122 is comprised of ferromagnetic material having a higher coercivity than the strip 120 and comprises in the preferred embodiment the low permeability ferromagnetic material manufactured and sold under the tradename Vicalloy. In the preferred embodiment, the strip 122 is provided with a length of 3 inches, a width of ½ inch and a thickness of 1 to 2 mils. Circular apertures 124 are formed through the ferromagnetic 122 for reasons to be subsequently described. In the preferred embodiment, the apertures 124 comprise circles having diameters of ⅜ inch.

FIG. 7 illustrates the construction of the marker in its final form. The strips 120 and 122 are aligned in the manner illustrated and are sandwiched between two paper strips 128 and 130. The edges of the paper strips 128 and 130 may be glued together in order to hold the ferromagnetic strips in place. Adhesive may be applied to one of the paper strips in order to allow the marker to be secured to an object.

Figure 8:
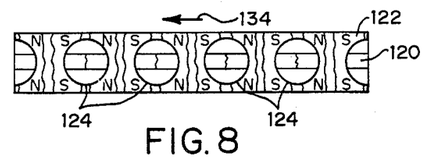
FIG. 8 is a top view illustrating the deactivation of the marker shown in FIG. 6 by a magnetic field directed parallel to the axis of the marker.
Figure 9:
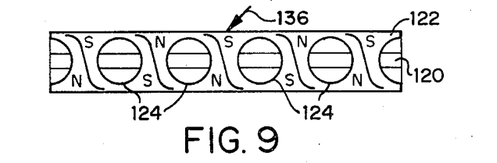
FIG. 9 illustrates the deactivation of the marker shown in FIG. 6 when the magnetic field is imposed at an angle to the axis of the marker.

FIGS. 8 and 9 illustrate the deactivation mode of the present system. When the strip 122 is not magnetized, the strip 120 operates as a transponder in the manner previously described. However, when the strip 122 is magnetized, as by a magnetic field directed generally parallel to the length of the marker as indicated by the arrow 134, the apertures 124 cause a plurality of pairs of alternate poles to be formed on the strip 122 in the manner illustrated in FIG. 8. Due to the relative magnetic properties of the strips 120 and 122, the strip 122 imposes upon the strip 120 the plurality of pairs of alternate poles, thereby substantially altering the transponder or transformer core-like characteristics of the strip 120. Hereinafter, when the deactivated marker is placed in the interrogation zone of the system, the strip 120 will thus no longer generate signals having the required harmonics for operation of the detection system. The present deactivation system may then be utilized to deactivate the markers after sale or valid checkout of an object.

FIG. 9 illustrates the formation of a plurality of pairs of alternate magnetic poles on the strip 122 due to the apertures 124 upon the application of a magnetic field disposed along a line indicated by the arrow 136. In this mode of magnetization of the marker, the magnetic poles formed on the strip 122 are skewed, but the strip 120 is still deactivated due to the provision of a plurality of poles along the length thereof.

However, it may be seen that care must be taken in the use of the marker shown in FIGS. 6 – 9 not to place the marker completely perpendicular with respect to the deactivating magnetic field. In such case, only two poles would be formed on opposite sides of strip 120. The strip 120 actually would lie between the two poles of a magnet. The poles are not alternate since they are not on the strip, thereby allowing the strip 120 to operate in some instances so as to generate harmonics which generate an alarm when passed through the present interrogation zone. The marker shown in FIGS. 10 – 13 is thus provided to eliminate the requirement of carefully positioning the marker within the deactivation unit 22, as this marker may be deactivated when placed at any angle relative to the magnetizing field.

Figure 10:
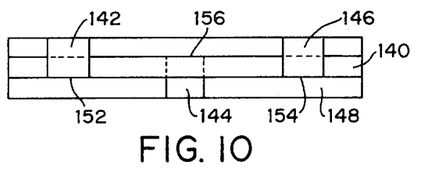
FIG. 10 is a top view of a deactivatable marker according to a second preferred embodiment of the invention which may be deactivated by the application of a magnetic field oriented at any direction relative to the marker.
Figures 11, 13:
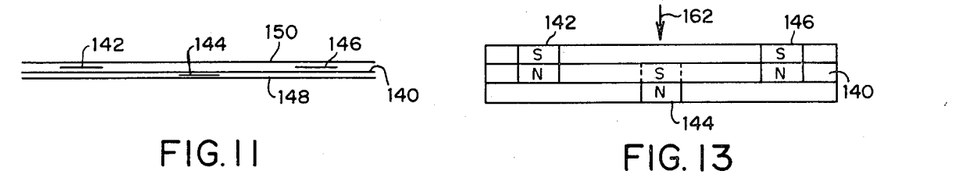
FIG. 11 is an exploded side view of the marker shown in FIG. 10.
FIG. 13 is an illustration of the deactivation of the marker shown in FIG. 10 in response to a magnetic field directed perpendicular to the length of the marker.

This preferred embodiment of the marker comprises an elongated ferromagnetic strip 140 constructed from Supermalloy in an identical manner as the previously described strip 120. A plurality of rectangular discrete elements 142 – 146 formed from a low permeability and high coercivity ferromagnetic material such as Vicalloy is positioned at spaced-apart locations along the length of the strip 140. Elements 142 and 146 are placed on the top side of the strip 140, while element 144 is placed on the bottom side of strip 140. A lower strip of paper 148 is illustrated in FIG. 10, with the upper strip of paper being removed in this view. Referring to FIG. 11, which is a slightly exploded view of the marker, the relationship of the strip 140 and elements 142 – 146 is illustrated relative to the lower paper strip 148 and an upper paper strip 150.

Referring again to FIG. 10 each of the rectangular elements 142 – 146 has a width equal to twice the width of strip 140. The rectangular elements 142 and 146 are disposed with their edges 152 and 154 coincident with the edge of the strip 140 and extend laterally from the strip 140 in the manner illustrated. The discrete element 144 is positioned with its edge 156 coincident with the other edge of the strip 140 and extends laterally from the strip 140 in the opposite direction from elements 142 and 146. The elements 142 – 146 enable the marker to be deactivated by a magnetic field disposed in any direction relative to the marker.

Figure 12:
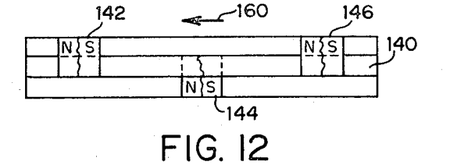
FIG. 12 is an illustration of the deactivation provided by the marker shown in FIG. 10 in response to a magnetic field directed parallel to the length of the marker.

For example, FIG. 12 illustrates the magnetization of the elements 142 – 146 by a magnetic field directed along in the direction of the arrow 160. In this mode of operation, north and south poles are formed on each of the elements 142 – 146 in the manner illustrated. The magnetized elements 142 – 146 thus impose upon the strip 140 three spaced-apart pairs of alternate north - south poles to alter the transpondent characteristics of the strip 140. Further, FIG. 13 illustrates magnetization of the elements 142 – 146 by a magnetic field disposed in the direction of an arrow 162. In this embodiment, each of the elements 142 – 146 is provided with north and south poles in the manner illustrated, and the strip 140 has imposed thereon two north poles and a south pole. The transpondent characteristics of the strip 140 are thus altered in a manner such that the detection circuitry of the invention will not detect the presence of the marker. It will also be understood that a magnetic field having a vector perpendicular to both of the above vector arrows 160 and 162 shown in FIGS. 12 and 13 will also deactivate marker strip 140.

It will be understood that the present invention also encompasses the positioning of all of the elements 142, 144 and 146 on either the top or the bottom of strip 140 (not shown) rather than staggered configuration shown in FIG. 11. This alternate construction provides simplicity of manufacture, but enables the resulting marker to be deactivated only by magnetic fields oriented within the plane defined by the marker. Magnetic fields oriented perpendicular to the plane defined by the marker would not deactivate this particular marker.

Figure 14:
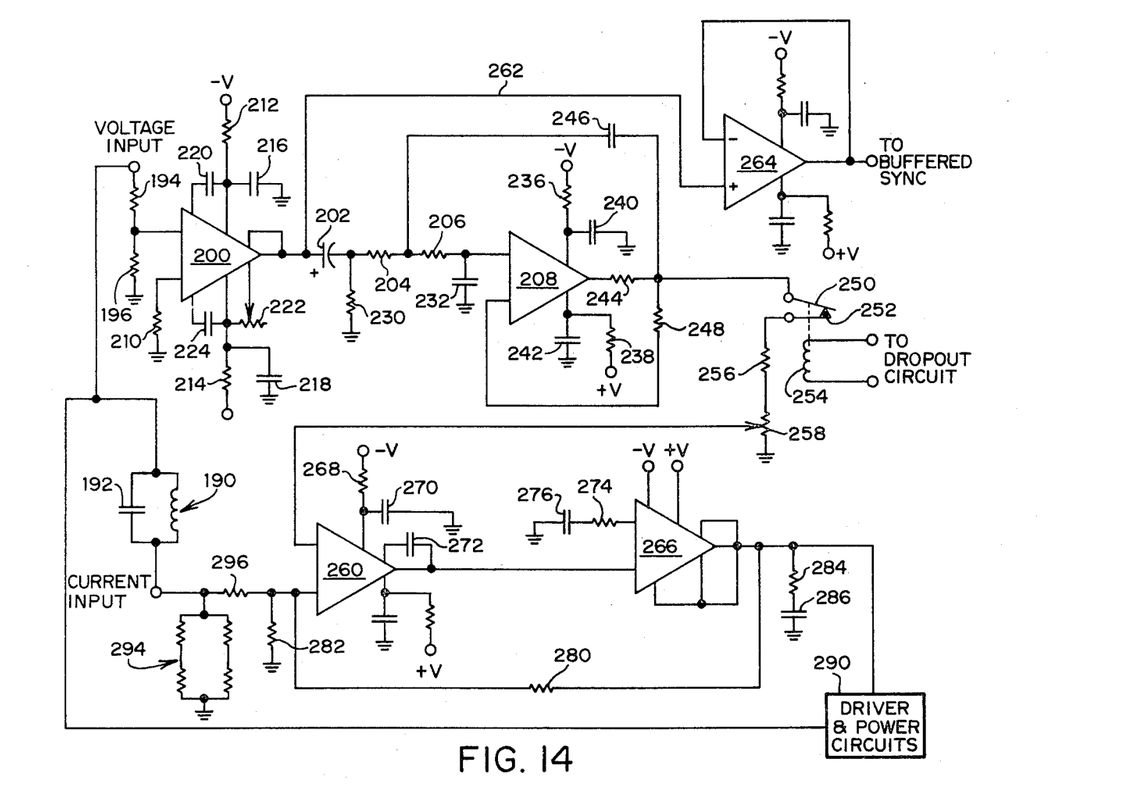
FIG. 14 is a schematic of the phase lock oscillator circuitry of the system shown in FIG. 2.

Referring to FIG. 14, the phase lock oscillator 30 and the preamplifier 32 previously noted in FIG. 2 are illustrated in schematic detail. One of the transmitting coils 190 is illustrated in schematic form, with a capacitance 192 connected thereacross to form an L–C circuit. One terminal of the L–C is connected through a voltage divider comprising resistors 194 and 196 and is applied to an input of a phase-lock loop circuit 200. In the preferred embodiment, the circuit 200 comprises the NE565A Phase-Lock Loop manufactured and sold by Signetics. As will be later described in great detail, the phase-lock loop 200 generates a square wave signal which is applied through a decoupling capacitor 202 and through resistors 204 and 206 to an input of an operational amplifier 208 connected as an active Butterworth filter.

The voltage input applied through resistors 194 and 196 is applied to the external input to the voltage comparator section of the phase-lock loop 200. Resistor 210 provides a balanced dc bias to the comparator section Resistors 212 and 214 are dropping resistors to reduce the supply voltage to the required bias voltage for the phase-lock loop 200. Capacitors 216 and 218 provide a power supply decoupling. Capacitor 220 is a timing capacitor which determines, along with resistor 222, the free running frequency of the voltage control oscillator of the phase-lock loop 200. Capacitor 224 is the external element of a low pass filter on the error voltage output of the voltage comparator section. The operation of capacitor 224 and an internal resistor in the phase-lock loop 200 is to smooth out the error signal from the voltage comparator section and apply it to the control voltage point of the voltage control oscillator in such a manner as to force the frequency of the voltage control oscillator to track the frequency of the locking voltage signal. The variable resistance 222 provides a variable frequency control for adjusting the free-running frequency of the voltage control oscillator.

A resistor 230 and resistor 204, along with capacitor 232, form a voltage dividing network and phase correction network for the input signal of the active filter 208. Resistors 236 and 238, along with capacitors 240 and 242, provide power supply decoupling for the active filter.

A resistor 244 and a capacitor 246 determine the attenuation characteristics of the active filter by providing an ac feedback path for the cancellation of the higher frequency. Resistor 248 provides negative feedback for stability of the operational amplifier 208. Output of the active filter, which operates to chop off the higher harmonics to provide an output sine wave, is applied to a relay switch element 250 which is movable into and out of contact with a relay contact 252. Operation of the relay member 250 is controlled by a relay coil 254 which is operated by the dropout circuit to be subsequently described. When the relay switch member 250 is closed against the contact 252, the output from the active filter is applied through a resistance 256 and a variable resistance 258 to an input of a voltage amplifier 260, which may comprise, for example, an NE531T amplifier manufactured and sold by Signetics. Resistor 258 may be adjusted to provide a variable gain control.

The output of the phase-lock loop 200 is also applied via lead 262 to an operational amplifier 264 connected to provide an amplified square wave for subsequent gating functions in the detecting circuitry. The output of the voltage amplifier 260 is applied to the input of a current amplifier 266, which in the preferred embodiment may comprise an MC1438R amplifier manufactured and sold by Motorola Corporation. The network comprised of resistance 268 and capacitor 270 provides power supply decoupling for the voltage amplifier 260. A capacitor 272 provides high frequency compensation for the voltage amplifier 260. The network comprised of resistor 274 and capacitor 276 provides high frequency compensation for the amplifier 266. The voltage amplifier and current amplifier are tied together in a feedback network including resistors 280 and 282. This feedback network provides negative voltage feedback for both gain control and stability of the amplifier.

The network formed by resistor 284 and capacitor 286 at the output of amplifier 266 provides a high frequency roll-off network to eliminate higher order harmonics or noise which may be present on the output of the amplifier 266. The amplified output of amplifier 266 is applied to the driver and power output circuits 290 which will be subsequently described in FIGS. 16 and 17. The power amplified signals are then applied directly to the terminal of the coil 190 and capacitor 192 in order to drive the coil 190 to provide the desired alternating magnetic field within the interrogation zone of the invention. The opposite terminals of the coil 190 and capacitor 192 are applied to the input of the amplifier 260 and are also applied to circuit ground through resistor network 294. The voltage developed by load current flowing through the resistor network 294 appears at resistor 296 and provides a current feedback signal which is developed across resistors 296 and 284. Thus, the present amplifier system includes both voltage and current feedback in order to stabilize the circuit.

As will be subsequently described in greater detail, the output applied from the driver and power output circuit 290 is less than full wave drive, thus providing an alternating magnetic field generated by coil 190 which has improved distortion characteristics which enable the coil to be driven by more economical and efficient driving circuitry.

Figure 15:
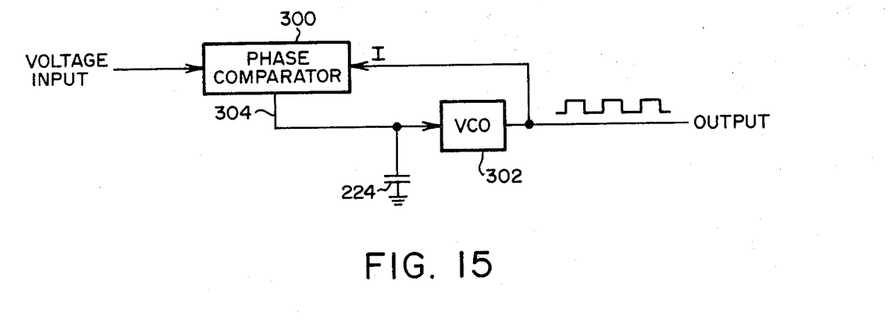
FIG. 15 is a block diagram of a portion of the phase lock oscillator shown in FIG. 14.

FIG. 15 illustrates in greater detail the interconnection of the phase-lock loop 200 previously described with respect to FIG. 14. As is known, the phase-lock loop circuit includes a phase comparator 300 and a voltage controlled oscillator (VCO) 302. The voltage received from the coil 190 and capacitor 192 are applied to the phase comparator 300 and the phase of the input voltage is compared with the output current from the VCO 302. The resulting error signal from the phase comparator 300 is applied at the output 304 of the comparator and is applied to the low pass filter capacitor 224 and is applied to the input of the VCO 302. The output of the phase comparator 300 thus controls the frequency generated by the VCO 302. The circuitry shown in FIG. 15 thus continually maintains the output square wave signal at a frequency which provides resonance of the L–C circuit formed by the coil 190 and the capacitor 192. In this manner, the L–C circuit is operated at the desired resonance and provides the most efficient operation of the system. As previously noted, in the preferred embodiment, the circuit operates at a nominal center frequency of 2,500 Hz, but the operation of the circuitry shown in FIG. 15 may slightly vary this frequency to continually operate the L–C circuit of the transmitting coils at resonance at all times under various operating and loading conditions.

Figure 16:
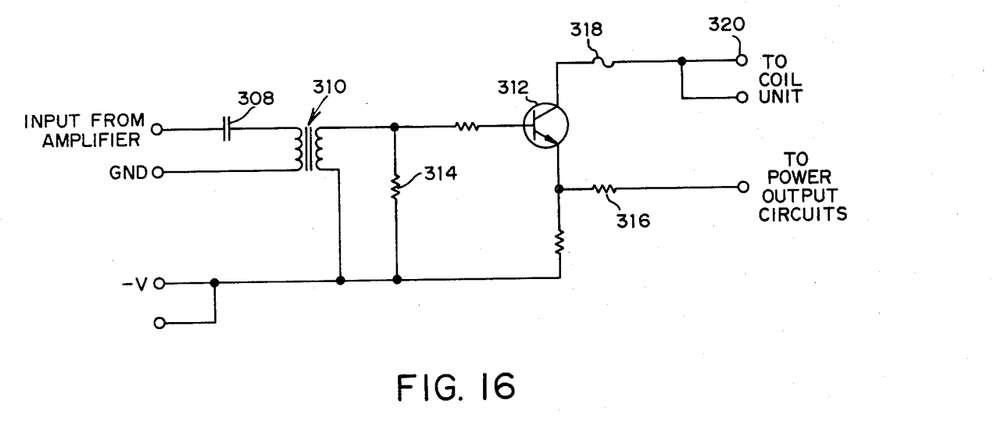
FIG. 16 is a schematic diagram of one of the driver circuits of the system shown in FIG. 2.

FIG. 16 illustrates the driver circuit of the invention. The signal generated by the amplifier 266 shown in FIG. 14 is applied through a decoupling capacitor 308 and through a transformer 310 to the base of a driver transistor 312. A terminal of the primary winding of the transformer 310 is connected to ground, with the terminal of the secondary of the transformer being connected to a source of negative bias voltage. The transformer 310 is a 1-to-1 transformer and shifts the level of the signal downward in order that the transmitting coil of the invention may be tied to circuit ground. A transformer load resistor 314 is connected across the secondary of the transformer 310. The transistor 312 is connected in an emitter follower configuration and generates an output signal through resistor 316 for application to the power output circuitry shown in FIG. 17. The collector of the transistor 312 is connected through a fuse 318 which operates to protect the transistor and transformer of the system. The collector of the transistor 312 is connected to a terminal 320 which is connected to the transmitting coil 190 shown in FIG. 14.

Figure 17:
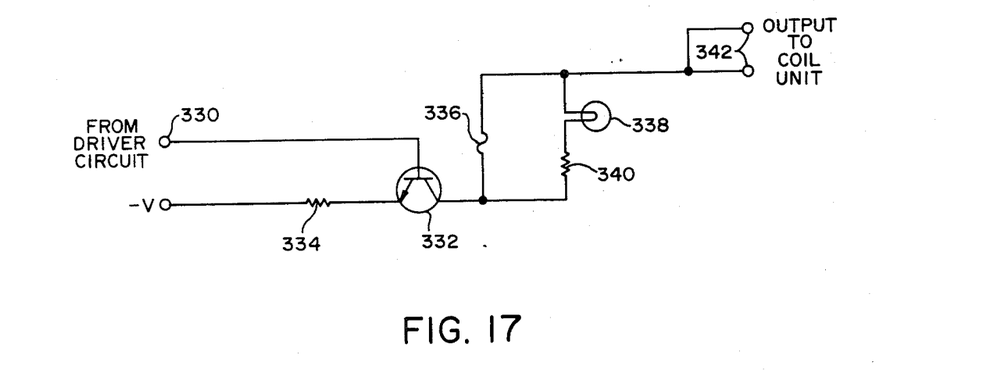
FIG. 17 is a schematic diagram of one of the power amplifiers of the system shown in FIG. 2.

FIG. 17 illustrates one stage of the plural stage power output circuit of the system shown in FIG. 14. In the preferred embodiment, the power output of the circuit includes 10 stages identical to the one shown in FIG. 17 connected in parallel to provide the desired power output. The output from the driver circuit shown in FIG. 16 is applied to terminal 330 and to the base of a transistor 332. A balancing resistor 334 is connected between the emitter of the transistor 332 and a source of negative bias voltage. The collector of transistor 332 is connected to a fuse 336 which is connected across an indicator lamp 338 and a resistance 340. If the fuse is blown, the indicator lamp 338 becomes energized and indicates the blowing of the fuse. The output of the collector of the transistor 332 is applied to terminal 342 for output directly to the transmitting coil unit comprising coil 190 and capacitor 192.

The outputs of each of the parallel connected power output circuits are tied to the common summing node and are applied to the transmitter coil.

An important aspect of the invention is that the current applied at terminal 342 may be less than full wave. In the embodiment shown, the current applied at terminal 342 is a half wave signal, with the positive current peak eliminated. Thus, the transmitting coil 190 in FIG. 14 is driven only by the negative going portions of the current. Due to the fact that the L–C circuit comprising the coil 190 and the capacitor 192 has a relatively high Q, the L–C circuit tends to generate a continuous magnetic field by a "fly-wheeling" operation. This driving of the transmitting coil 190 by spaced-apart current pulses results in a magnetic field generated by the coil 190 which has better distortion characteristics than a system wherein the coil is continuously driven. Driving systems for the coil 190 inherently produce distortion of the generated magnetic field, and by reducing the amount of time that the coil is directly driven, the distortion in the magnetic field is reduced. Moreover, the use of less than full wave current drive of the transmitting coil results in more efficient use of the transistor circuitry, thereby simplifying the driving circuitry and resulting in economy of construction and operation. Further, the use of less than full wave current drive results in less heat dissipation by the transistors, thereby resulting in longer life of the transistors and requiring less heat sink capabilities.

While the circuitry shown in FIG. 17 is directed to half wave current drive of the transmitting coil, it will be understood that improved distortion characteristics of the magnetic field may also result in less than half wave current drive. For example, it has been found that driving the transmitting coil 190 with a 60° current signal for alternate cycles results in a magnetic field having improved distortion characteristics.

Figure 18:
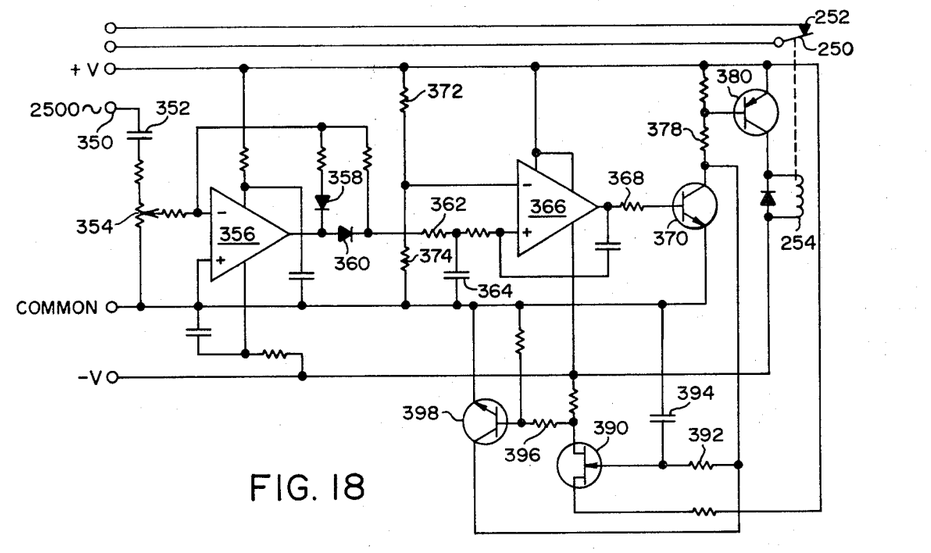
FIG. 18 is a schematic diagram of the dropout circuit shown in FIG. 2.

FIG. 18 illustrates in schematic detail the dropout circuitry of the invention. The 2,500 Hz signal generated by the oscillator of the invention is applied at terminal 350 and is applied through an ac coupler capacitor 352 and through a voltage divider 354 to the inverting input of an operational amplifier 356. The operational amplifier is interconnected with diodes 358 and 360 and associated circuitry to provide a precision rectifier circuit. The output of the rectifier circuit is applied as a dc signal to a filter comprising a resistor 362 and a capacitor 364. The filter signal is applied to the input of a comparator 366, the output of which is applied to a resistor 368 to the base of a transistor 370. A reference voltage is defined by resistors 372 and 374 and is applied to the second input of the comparator 366. The output of the comparator 366 is thus an error signal when the dc voltage applied via resistor 362 differs from the voltage level applied as a reference level. Thus, when the variable dc voltage drops below the reference dc voltage, a negative pulse is generated from the comparator 366 which turns transistor 370 off.

The collector of transistor 370 is connected through a resistance 378 to the base of a transistor 380. When transistor 370 is turned off, transistor 380 is turned off. The collector of transistor 380 is connected to the coil 354, previously noted as the dropout relay coil in FIG. 14. When the transistor 380 is turned off, the normally closed relay switch 250 is opened due to energization of the coil 254 and the transmitting system of the invention is disconnected from the transmitting coil. The operation of the dropout circuit thus operates to protect the present system is case of the passage of an extremely heavy metal object through the interrogation zone of the invention which would tend to load the transmitting coil down and change the transmitter frequency. Passage of such a very heavy metallic load through the interrogation zone, without the use of the dropout circuit, would in some instances provide a false alarm or cause damage to the power amplifier of the circuit.

The emitter of a unijunction transistor 390 is connected through a resistance 392 to the collector of the transistor 370. A capacitor 394 is connected across circuit ground and the main terminal of the resistor 392 to form an R–C timing network. The emitter of transistor 380 is tied to a base of the unijunction transistor 390. The other base of the transistor 390 is connected through a resistor 396 to the base of a transistor 398. The collector of a transistor 370 is connected directly to the collector of the transistor 398.

The unijunction transistor 390 and transistor 398 operate to form a timing and reset circuit. When the transistor 370 is turned off, the charging voltage is applied through resistor 378 and 392 and capacitor 394 is charged. When the voltage across capacitor 394 reaches a predetermined level, the transistor 390 fires and turns on transistor 398. Transistor 398 operates to turn transistor 380 back on for a time interval determined by the time constant of the circuit. The coil 254 is then energized to close relay switch member 250 against the contact 254 such that the circuit tends to turn on again. If the conditions which cause the circuit to orignally drop out still exist, the transistor 380 will again be turned off and the relay will be dropped out to again disconnect the circuit.

Figure 19:
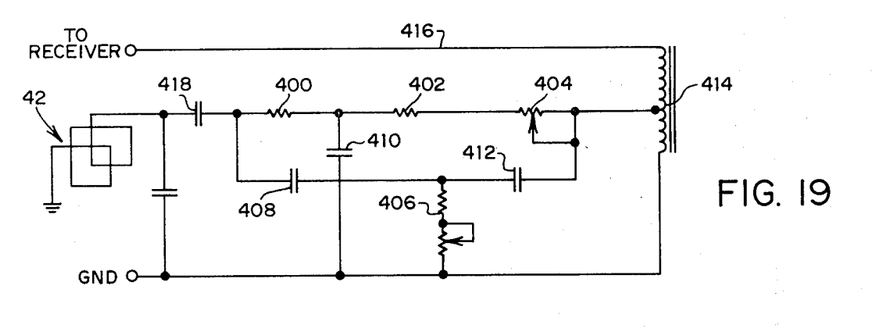
FIG. 19 is a schematic diagram of the receiver filter of the system shown in FIG. 2.

FIG. 19 illustrates the receiver filter 44 shown in FIG. 2 in schematic detail. The receiving antenna 42 comprises a plurality of loops of wire and detects the harmonic signal of the fundamental frequency generated by the transmitting coil. The harmonic signals are applied to a twin T notched filter comprising resistors 400, 402, 404, 406 and capacitors 408, 410 and 412. The notched filter operates to eliminate the 2500 Hz fundamental frequency generated by the transmitting coil. Resistor 404 is also connected to a tap of a transformer 414, a terminal of which is applied via lead 416 to the receiver circuitry. An important aspect of the invention is that a capacitor 418 operates in conjunction with the notched filter and the transformer 414 to provide a high pass filter for eliminating the fundamental frequency and lower order harmonics which are not required for the invention.

Figure 20:
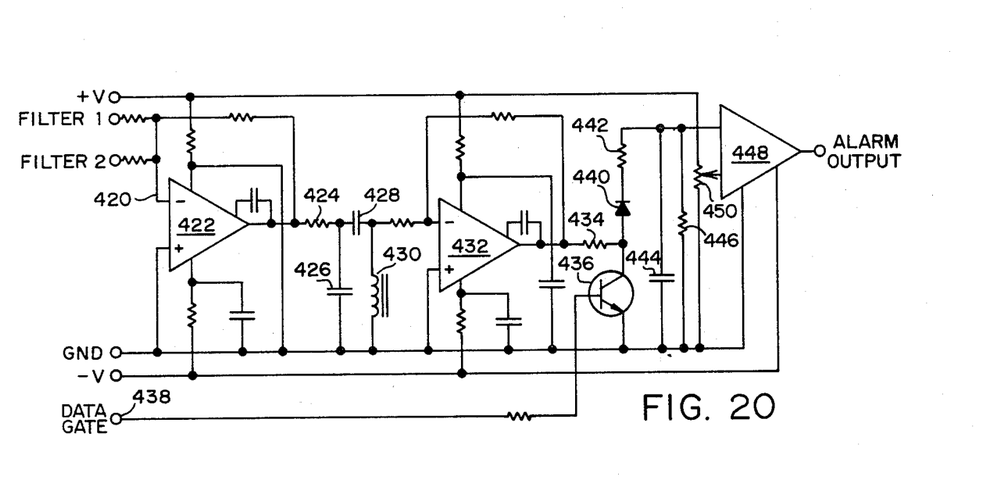
FIG. 20 is a schematic diagram of the receiver detector for the system shown in FIG. 2.

FIG. 20 illustrates in schematic detail the amplifier integrator and detector of the system shown previously in FIG. 2. Filters according to the circuitry shown in FIG. 19 are connected to each one of the receiving coils located in the coil units 10 and 12. The outputs of the filters are added at a summing node 420 and are applied to the inverting input of an amplifier 422. The output of amplifier 422 is applied to a low pass filter comprising a resistor 424 and capacitor 426 in order to eliminate noise such as radio stations and the like. The signals are then applied through a high pass filter comprising capacitor 428 and a shielded inductance 430 in order to eliminate unwanted frequencies. The signal is then applied to an input of an amplifier 432 which generates an amplified signal which is applied through a resistor 434 to the collector of the transistor 436. An important aspect of the invention is that the transistor 436 is gated by the signal data gate applied at terminal 438. The data gate signal is derived from the amplifier 264 previously shown in FIG. 14.

The gated signal is then applied through a diode 440 and a resistor 442 to an integrator comprising capacitor 444 and resistor 446. The integrator operates to average out the random noise and to prevent false triggering of the device. The integrated signal is then applied to an input of a comparator 448. The reference voltage is applied to the comparator 448 through a variable resistor 450. An alarm output is generated by the comparator 448 when the integrated value rises above the preselected reference voltage. The alarm signal may be utilized to operate an audible noise such as a horn or the like or alternatively may operate a visual alarm, such as a lamp or the like.

Figure 21:
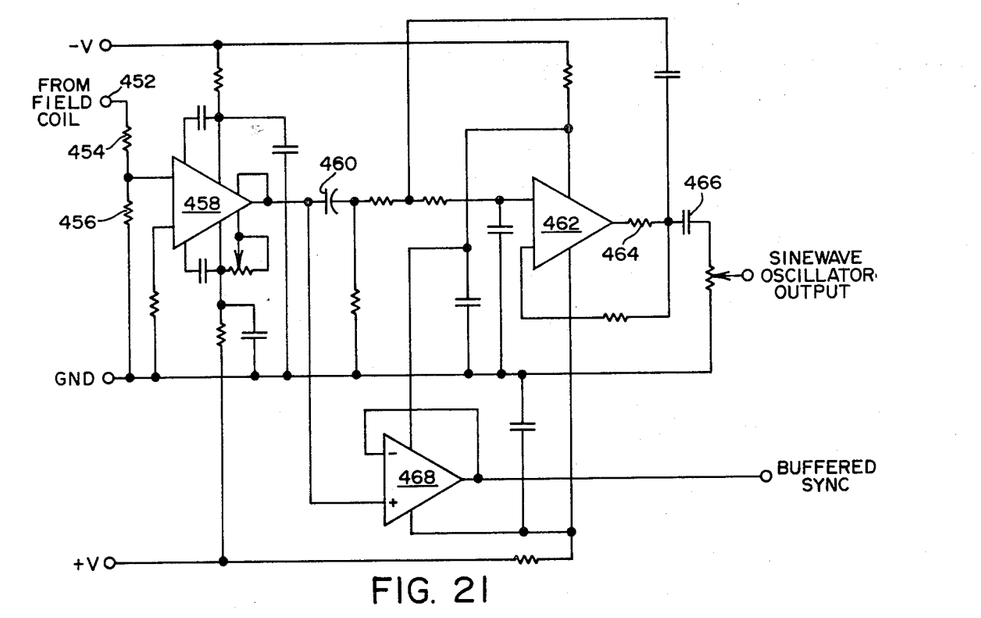
FIG. 21 is a schematic diagram of the oscillator for the deactivation system shown in FIG. 3.

FIG. 21 is a schematic diagram of the oscillator 60 of the deactivation system shown in FIG. 3. The oscillator is operated in a similar manner as the oscillator previously described in FIG. 14, in that the frequency generated by the oscillator is maintained by a phase-lock loop in order to maintain the transmitting coil or the deactivater system in resonance, regardless of the load on the field imposed in the aperture 28 of the deactivation circuit. The signal applied from the transmitting coil of the deactivation circuit is applied to terminal 452 and through voltage dividers 454 and 456 to the input of a phase-lock loop 458. The phase-lock loop 458 operates in the same manner as the circuit shown in FIG. 16 to generate an output through a capacitor 460 having a frequency to cause resonance of the transmitting coil.

The signal is applied through a filter network including an operational amplifier 462 and is then applied through resistor 464 and capacitor 466 as a sine wave oscillator output for amplification and for driving of the field coil. The field coil thus generates a magnetic field within the deactivation zone in order to sense the presence of a marker in order to enable the marker to be deactivated. The output from the phase-lock loop 458 is also applied to an input of an amplifier 468 which generates a buffered sync signal which is utilized to gate the receiver of the deactivator circuitry in a similar manner as that previously described in FIG. 20.

Figure 22:
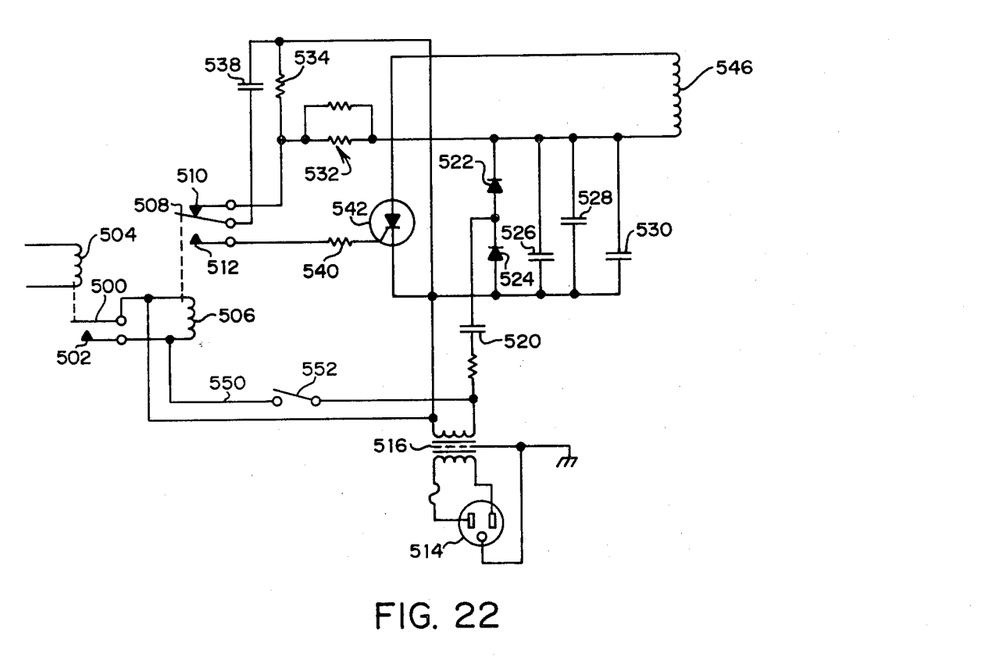
FIG. 22 is a schematic diagram of the deactivation gaussing circuitry of the system shown in FIG. 3.

FIG. 22 illustrates in schematic detail the deactivator gaussing circuitry of the invention. A relay switch member 500 is selectably movable against a relay contact 502 by a relay coil 504. The relay coil 504 is attached to the output of the detector 70 of the deactivator circuitry shown in FIG. 3. As previously noted, the amplifier 68 and detector 70 as shown in FIG. 3 are identical to the detecting circuitry of the system shown in FIG. 2. When a marker is detected with the deactivation unit by the detector, a signal is applied to the relay coil 504 and the relay member 500 is pulled out of contact with the contact 502. Voltage is then applied to the relay coil 506 in order to operate the relay switch member 508. Normally the relay switch member 508 is closed against the relay contact member 510. Upon operation of the energization of coil 506, the relay switch member 508 is closed against contact 512.

A line plug 514 is operable to be plugged into a source of 110 V ac which applies alternating current through a transformer 516 to relay coil 506 when desired. Alternating current is applied to a capacitor 520 through diodes 522 and 524 to charging capacitors 526, 528 and 530. Capacitors 520, 526, 528 and 530 and diodes 522 and 524 comprise a conventional voltage doubler circuit. Relay contact 510 is connected to a voltage divider and safety bleeder resistor circuit 532. Contact 510 is also connected through a resistor 534 to the source of alternating current. The relay switch member 508 is connected through a capacitor 538 to the source of alternating current. The contact 512 is connected through a resistor 540 to the gate of an SCR 542.

The anode of the SCR 542 is connected to a guassing coil 546, with the other terminal of the gaussing coil 546 being connected to the terminals of the capacitors 526 – 530. In the preferred embodiment, the degaussing coil 546 comprises 35 turns of No. 6 wire.

In operation of the deactivation system shown in FIG. 22, when the detector in the deactivation system detects the presence of an active marker, voltage appears at the coil 504 and the relay member 500 is actuated in order to apply voltage to the relay coil 506. The relay switch member 508 is moved against the contact 512 in order to connect the charged capacitor 538 to the gate control of the SCR 542. The SCR 542 is then turned on and the energy stored in capacitors 526, 528 and 530 is connected across the gaussing coil 546 to provide an extremely large energy pulse to the deactivator chamber. The deactivating pulse magnetizes the high coercivity ferromagnetic member in the manner previously described to deactivate the marker.

When the relay member 508 again closes against contact 510, the charging cycle is again initiated and capacitor 538 charges to a voltage across resistor 534. The capacitors 526, 528 and 530 are charged approximately twice the voltage of the ac line. If the marker within the deactivation chamber is not deactivated, the sensor again senses the presence of marker and again initiates the generation of a magnetic field from the gaussing coil 546 to insure that the marker is deactivated. The peak intensity of the magnetic field generated by the coil 546 is at least 100 oesteds, and in the preferred embodiment in the range of 1,000 oesteds. If it is desired to manually operate the system, a foot switch 552 is provided which may be manually closed by the foot of the operator against a contact in line 550 to energize coil 506. The SCR 542 is thus triggered to cause the discharge of the capacitors 526 – 530 across the coil 546.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a system for detecting a ferromagnetic marker within a magnetic field interrogation zone, the combination comprising:
    coil means placed adjacent said interrogation zone and having a relatively high Q,
    electrical circuitry connected to said coil means for applying a chopped sinusoidal electrical signal to drive said coil means to generate an alternating magnetic field in said interrogation zone, said chopped signal comprising a plurality of spaced-apart periodic pulses of the same polarity and of less than one half wave configuration, such that said coil is not continuously driven by said electrical signal but wherein a continuous magnetic field having improved distortion characteristics is provided due to the relatively high Q of said coil,
    means for detecting a predetermined harmonic signal generated by said marker in response to said continuous magnetic field in said interrogation zone,
    means for gating said detecting means in synchronism with said alternating electrical signal, and
    means for initiating an alarm indication upon the detection of said harmonic signal.

2. In a system for detecting a ferromagnetic marker in an interrogation zone, the combination comprising:

coil means for being disposed adjacent said interrogation zone,
    electrical driving circuitry for applying alternating electrical signals to said coil means to cause the generation of a magnetic field in said interrogation zone, said electrical signals having a fundamental frequency substantially equal to the resonant frequency of said coil means, and phase-lock loop means connected between said coil means and said electrical driving circuitry for varying said fundamental frequency to maintain said coil means in resonance irrespective of variations in the loading of the magnetic field in said interrogation zone.

3. The combination of claim 2 wherein said phase-lock loop comprises:

a phase comparator for comparing the voltage appearing on said coil means and a signal representative of current in said coil means, and voltage controlled oscillator means for generating an alternating electrical signal having a frequency dependent upon the output of said comparator means.

4. The combination of claim 3 wherein said signal representative of current comprises the output of said oscillator means.

5. A coil unit for detection of objects passing through an interrogation zone comprising:

an upright housing for being positioned adjacent said interrogation zone, a plurality of loops of rigid metal pipe having a hollow air-filled interior, said loops being mounted within said upright housing and extending vertically for approximately the height of a person traversing said interrogation zone, a predetermined capacitance mounted in said housing and connected across said loops of rigid metal pipe to tune said loops to a predetermined fundamental frequency, circuitry connected to said loops of rigid metal pipe to generate from said pipe an alternating magnetic field having said fundamental frequency, said fundamental frequency substantially equal to the resonant frequency of said pipe and said capacitance, and a plurality of coils of wire mounted in said housing in the center of said loops of rigid metal pipe and tuned to receive harmonics of said fundamental frequency.

6. The coil unit of claim 5 wherein said metal pipe comprises copper pipe.

7. The coil unit of claim 5 wherein said pipe has an interior diameter of at least about one inch.

8. The coil unit of claim 5 and further comprising three loops of said rigid metal pipe.

9. The coil unit of claim 5 and further comprising a pair of said coil units disposed on opposite sides of said interrogation zone.

10. The coil unit of claim 9 wherein said loops of pipe in each of said pair of coil units are connected in an aiding configuration.

11. A system for detecting a ferromagnetic magnetic marker in an interrogation zone comprising:

coil means placed adjacent said interrogation zone, electrical circuitry for applying alternating electrical signals to said coil means for generating an alternating magnetic field in said interrogation zone, and means responsive to the presence of unusually large magnetic objects within said magnetic field for disconnecting said electrical circuitry from said coil means.

* * * * *